(12) United States Patent
Dutta et al.

(10) Patent No.: US 6,993,476 B1
(45) Date of Patent: Jan. 31, 2006

(54) SYSTEM AND METHOD FOR INCORPORATING SEMANTIC CHARACTERISTICS INTO THE FORMAT-DRIVEN SYNTACTIC DOCUMENT TRANSCODING FRAMEWORK

(75) Inventors: Rabindranath Dutta, Austin, TX (US); Christian Lita, Austin, TX (US); Jeffrey Edward Rodriguez, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/383,742

(22) Filed: Aug. 26, 1999

(51) Int. Cl.
*G06F 15/16* (2006.01)
*G06F 17/30* (2006.01)
*G06F 17/27* (2006.01)

(52) U.S. Cl. .......................... 704/9; 709/230; 709/203; 704/2; 704/8; 715/530; 707/10

(58) Field of Classification Search ................. 704/1, 704/9, 10, 2, 8; 715/530; 345/735, 743; 709/230, 201, 203; 703/27; 707/10
See application file for complete search history.

(56) References Cited

U.S. PATENT DOCUMENTS

| | | | | |
|---|---|---|---|---|
| 5,329,446 A | * | 7/1994 | Kugimiya et al. | ............. 704/4 |
| 5,548,508 A | * | 8/1996 | Nagami | ......................... 704/2 |
| 5,587,902 A | * | 12/1996 | Kugimiya | ...................... 704/2 |
| 5,678,052 A | | 10/1997 | Brisson | ....................... 395/754 |
| 5,701,497 A | * | 12/1997 | Yamauchi et al. | ............. 704/3 |
| 5,848,386 A | * | 12/1998 | Motoyama | ..................... 704/5 |
| 5,918,013 A | | 6/1999 | Mighdoll et al. | ...... 395/200.47 |
| 6,080,202 A | * | 6/2000 | Strickland et al. | ............ 703/27 |
| 6,119,078 A | * | 9/2000 | Kobayakawa et al. | ......... 704/3 |
| 6,247,048 B1 | * | 6/2001 | Greer et al. | ................. 709/219 |
| 6,345,048 B1 | * | 2/2002 | Allen, Jr. et al. | ............ 707/104 |
| 6,345,279 B1 | * | 2/2002 | Li et al. | ................... 707/104.1 |
| 6,563,517 B1 | * | 5/2003 | Bhagwat et al. | ............. 345/735 |

FOREIGN PATENT DOCUMENTS

| | | |
|---|---|---|
| JP | 03-123965 | 5/1991 |
| JP | 09-153065 | 6/1997 |
| WO | WO 98/44424 | 10/1998 |

OTHER PUBLICATIONS

Canning et al.., "Syntactic Simplification of Newspaper Text for Aphasic Readers", Aug. 19, 1999, SIGIR '99 Proceedings of the Customised Information Delivery Workshop, Whole Document.

(Continued)

*Primary Examiner*—Richemond Dorvil
*Assistant Examiner*—Lamont Spooner
(74) *Attorney, Agent, or Firm*—Duke W. Yee; Jeffrey S. LaBaw; Wayne P. Bailey (57) ABSTRACT

Initially, a client requests a specific document and provides the preferences, including readability level preferences of the document, locale preferences, content filtering instructions preferences, governmental regulations preferences, natural language preferences, and document syntactic format preferences. The transcoding proxy requests and receives the document from the origin server, with the document having origin semantic characteristics. The document from the origin server has an origin readability level and origin locale, is conformant with origin content filtering instructions and origin governmental regulations, and is in origin natural language and in origin document syntactic format. Using the client semantics preferences, the transcoding proxy revises the document in a sequential or parallel fashion. The origin semantics characteristics of the document are, thus, revised to the semantic preferences specified by the client.

27 Claims, 7 Drawing Sheets

OTHER PUBLICATIONS

Smith et al., "Transcoding Internet Content for Heterogeneous Client Devices", Circuits and Systems, 1998, pp. 599-602.

Tan et al., "Internet Content Filtering and Blocking—The Asian Approach", Global Networking '97 Joint Conference, pp. 138-147.

Bharadvaj et al., "An Active Transcoding Proxy to Support Mobile Web Access", Reliable Distributed Systems, 1998 IEEE, pp. 118-123.

Aykin, "Defending and Offending Cultures", Human-Computer Interaction: Ergonomics and User Interfaces 1999, pp. 506-510.

* cited by examiner

SYSTEM AND METHOD FOR INCORPORATING SEMANTIC CHARACTERISTICS INTO THE FORMAT-DRIVEN SYNTACTIC DOCUMENT TRANSCODING FRAMEWORK

BACKGROUND OF THE INVENTION

1. Technical Field

The present invention relates to the field information processing in a distributed network. More particularly, the present invention relates to the transcoding of web based content and enterprise content from one format to another. Still more particularly, the present invention relates to a system and method for increasing the functionality of transcoders by the inclusion of semantic features.

2. Description of Related Art

Transcoding is the process of transforming the format and representation of content. Computers, of course, are not inherently intelligent; they need to be told exactly what things are, how they are related, and how to deal with them. Clearly, a simple way for computers to communicate and readily exchange data is needed. Transcoding is a key element in this exchange. What all of this means is, enterprise data and applications, or web-based data, can be leveraged by multiple users with multiple devices in a manner that is seamless across the network, and in a manner that is tailored to the specific user and device. The content, therefore, may be delivered in a wide range of networks.

There is a vast repository of data available on the Web. There is an even larger repository of business information, such as enterprise data, available on legacy systems. There is a substantial opportunity to extend the use of enterprise data by transcoding the formats, that is, bringing them out from behind legacy protocols. As enterprises expand into new e-business markets, and as their workforces become more mobile and widespread, easy access to legacy data becomes even more critical.

There are three main types of transcoding:

Data or syntactical transcoding is the conversion of data from one format to another, typically from a non web-friendly format to a friendly one (e.g., Advanced Function Presentation (AFP) to Scalable Vector Graphics (SVG), extensible markup language (XML) to hypertext markup language (HTML), etc.). Data transcoding can be used to take advantage of new web formats, such as SVG and extensible HTML (XHTML). Other examples of syntactical transcoding include converting the format of portable document format (PDF) documents to HTML or XML. For example, many portal web sites provide a map service for users to locate specific addresses across the United States (e.g., Yahoo, a product of Yahoo!, Inc., 3420 Central Expressway, Santa Clara, Calif. 95051). Today, the original vector-based map data is converted to a graphics interchange format (GIF) file before being sent to the client browser. Once SVG becomes a standard format supported by browsers, a transcoder can be used to convert the map data into SVG on the fly, preserving the quality and flexibility of the original data. Users will then be able to manipulate that vector graphics data locally on the client without having to access the server again. Data transcoding can also be used to aggregate content for presentation to the user in a convenient and accessible manner. Again, portals such as Yahoo are a good example. They allow their customers to configure their own home pages to provide a wide range of tailored information, from news and weather to favorite links and email status. The formats of the original data from this wide variety of sources must be converted to a browser-friendly format before being sent to the client. Reformatting of content is necessary in order to achieve universal access because devices utilize different markup languages to render content. For example, many wireless phones use the Wireless Markup Language (WML) to render content instead of HTML. Furthermore, the Palm Pilot uses Compressed Markup Language (CML), its own variant of HTML.

Device transcoding is the conversion of web formatted data (e.g., HTML) to one more suitable for displaying on certain devices, typically the filtering of data to be displayed on less capable clients in the Pervasive Computing (PvC) space. There are many reasons why content must be filtered, transformed, or reformatted to enable it to be universally accessed by devices. Filtering is typically required whenever resource constraints prohibit the storing or timely transmission of content. Because devices differ in the amount of memory that is accessible, they vary greatly with regard to how much content they are capable of storing. As a result, it may be necessary to filter out some content, such as large GIF and JPEG (joint photographic experts group) images, for devices with limited memory. Similarly, for devices connected by narrow bandwidth channels (e.g., 8 kbps), it may not be possible to deliver content that contains a large number of images in a timely fashion. Transformation is typically required to achieve universal access because many devices are only able to render a limited number of content representations. For example, the PalmPilot, available from 3COM Corporation, 5400 Bayfront Plaza Santa Clara, Calif. 95052-8145, is only capable of rendering images of Palm bitmap. Therefore, content that exists in GIF or JPEG must be transformed to Palm bitmap to be rendered. Other examples of transformation include the scaling of an image to enable it to completely fit on a display, and the rendering of text as synthesized speech for voice-driven car browsers.

Protocol transcoding is the transcoding of data which is typically broadcast using a non-HTTP protocol (e.g., 3270 (a class of terminals known as Display Devices, normally used to talk to IBM mainframes), 5150, etc.) into Hypertext transfer protocol (HTTP) format, to be displayed using a normal browser. Examples include the implementation of a 3270 terminal, a customer information control system (CICS, an IBM communications system now used for database handling) client, etc. (3270, 5150 and CICS are all registered trademarks of the IBM Corporation). This requires transcoding in both directions, as the user input needs to be converted back into the original protocol. Where bandwidth is an issue, for example, in a slow wireless connection, it may be necessary to transmit the web content in a protocol with suitable compression. The content would have to be transcoded twice, once at each end of the wireless connection.

Figure 1:
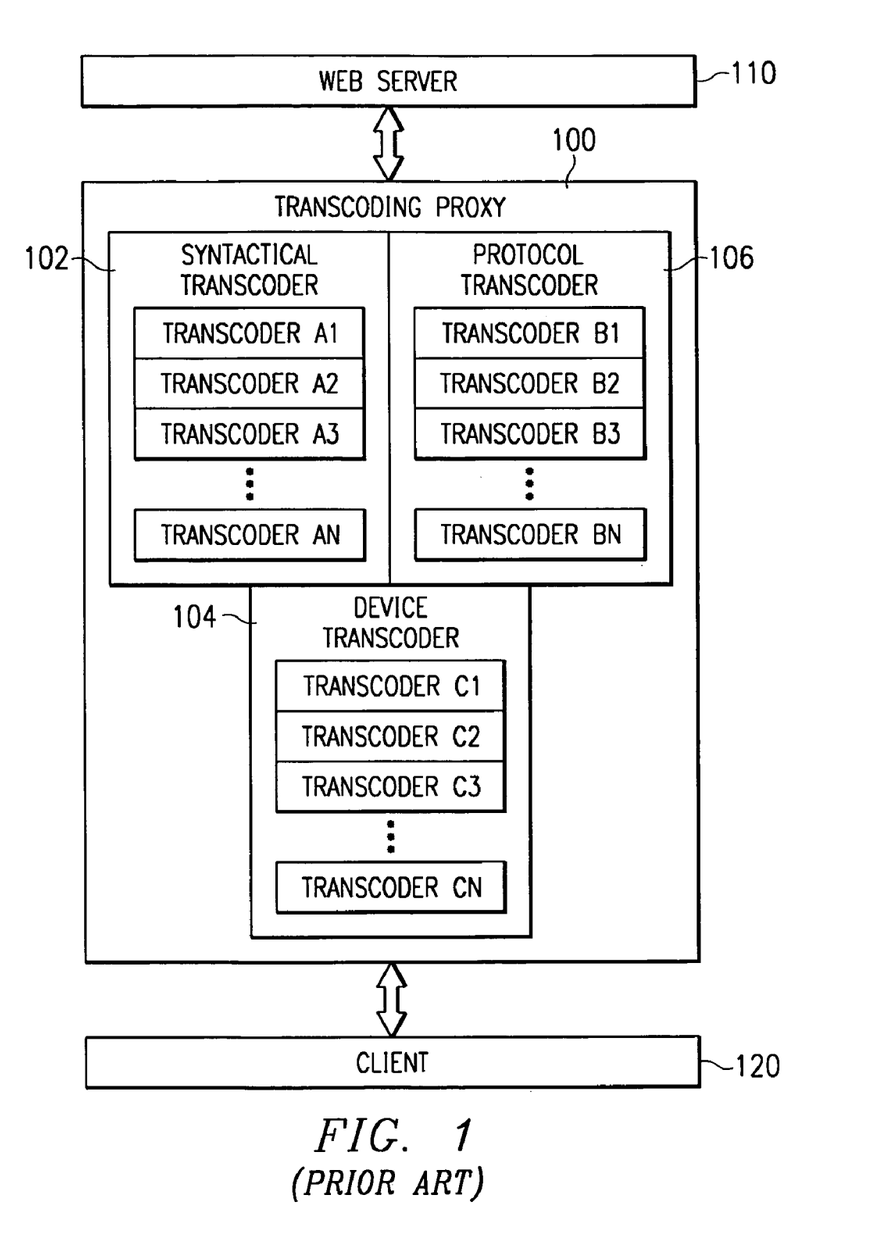
FIG. 1 depicts a prior art relationship between a transcoding proxy, a client, and a web server.

FIG. 1 depicts a prior art relationship between transcoding proxy 100, client 120 and web server 110. Initially, client 120, including an Internet browser, makes a request for a uniform resource locator (URL). Transcoding proxy 100 passes the request to web server 120 and intercepts the returned request results intended for client 120. Transcoding proxy 100 converts the requested documents to a form compatible with client 120 prior to returning the requested documents to client 120. In the depicted figure, transcoding proxy 100 includes syntactical transcoder 102, which further includes a plurality of transcoder functions A1 to AN, for converting individual data formats from one format to another. Also included in transcoding proxy 100 is device transcoder 104, which further includes a plurality of transcoder functions C1 to CN, for converting web formatted data to a format more suitable for displaying on certain devices. Finally, included in transcoding proxy 100 is protocol transcoder 106, which further includes a plurality of transcoder functions B1 to BN, for converting data which is typically broadcast using a non-HTTP protocol into HTTP format, to be displayed using a normal browser. Syntactical transcoder 102, device transcoder 104, and protocol transcoder 106 select the proper transcoder function by comparing syntactical, device, and protocol preferences supplied by client 120 with the returned requested document from web server 110. Transcoding proxy 100 reformats the requested document according to the preference data supplied by client 120 and transfers the document to client 120.

It is often the case that a single transformation for the data is not enough. For example, a portal transcoding application which has to supply a customized home page to a user who owns several web accessing devices, including a desktop computer and a palm computer, would first use data transcoding to convert the original source data into a presentation neutral format. Then, based on the type of device the user requested the information from, a second transformation, this time device transcoding, would be made to tailor the web content to be compatible with the target device. XML is an important technology for this type of transcoding. XML grammars are presentation neutral, which makes them excellent candidates for intermediate formats between legacy data and the final presentation form.

Figure 2:
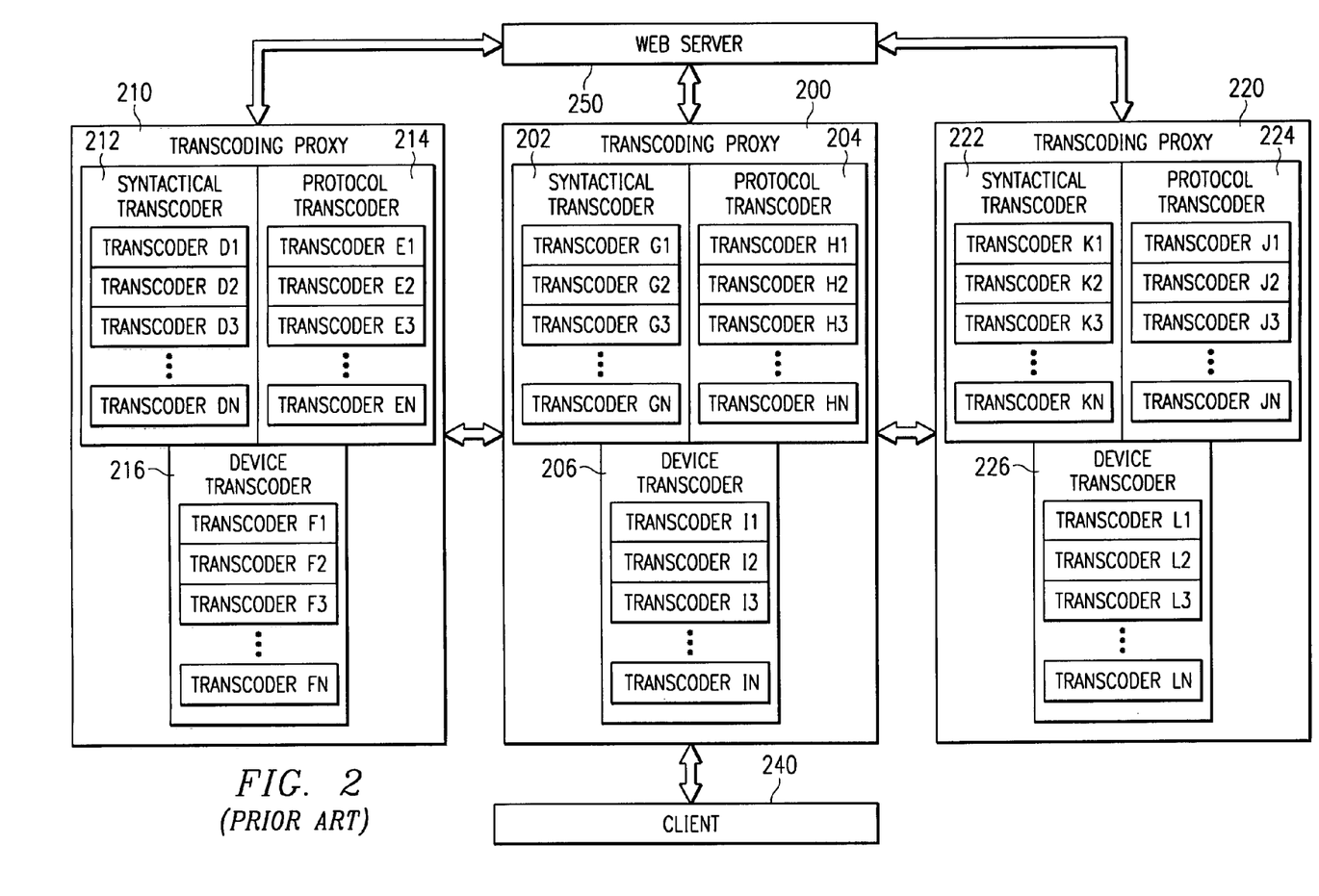
FIG. 2 depicts a prior art configuration between three transcoding proxies, a client, and a web server, for providing multiple transformations in order to properly format a document for a client.

FIG. 2 depicts a prior art configuration between transcoding proxies 200, 210 and 220, client 240, and web server 250, for providing multiple transformations in order to properly format a document for a client. Transcoding proxies 200, 210 and 220 are identical in functionality to transcoding proxy 100 and, therefore, will not be discussed in detail again. In the depicted example, client 240 makes a request for a uniform resource locator (URL). Transcoding proxy 200 passes the request to web server 250 and intercepts the results for client 240. Transcoding proxy 200 attempts to convert the requested document to a form compatible with client 240.

However, in the depicted example, as syntactical transcoder 202, device transcoder 206, and protocol transcoder 204 attempt to select the proper transcoder function, it is determined that transcoding proxy 200 does not possess the proper transcoder function to effect a complete transformation. In comparing the client preferences to the format of the returned requested document, a necessary transcoder function is missing. Therefore, rather than returning an improperly formatted document to client 240, transcoding proxy 200 passes the document to one of transcoding proxies 210 and 220 for intermediate processing. In so doing, transcoding proxy 200 can return a properly formatted document to client 240.

Transcoding occurs after the source data has been accessed (from a database, file server, etc.) but before the end user is able to access it. Precisely where the transcoding takes place depends upon the specific transcoding application. For example, the transcoding of financial data is likely to take place on or near the origin server for security reasons (i.e., inside the financial company's firewall). Device transcoding is more likely to take place as a last step before delivery to the user's web browser. In some cases, it may even be desirable to transcode data on the target client machine.

The term 'reverse proxying' refers to a setup where the proxy server is run in such a way that it appears to clients like a normal web server. That is, clients connect to it considering it to be the destination origin server and do not know that requests may be relayed further to another server, even through other proxy servers.

The word 'reverse' in reverse proxy refers to the inverted role of the proxy server. In the regular (i.e., forward) proxy scenario, the proxy server acts as a proxy for the client. The request is made on behalf of the client by the proxy server. However, in the reverse proxy scenario, the reverse proxy server acts as a proxy for the server. The proxy services requests on behalf of the server. While this may seem to be the same concept, merely expressed in two ways, the distinction becomes clear when considering the relationship of the proxy server to its client and origin server.

A forward proxy server, or a set of them, acts as a proxy to one or more clients. From the client's perspective, the proxy server is dedicated to servicing that client's needs, and all requests may be forwarded to the proxy server. A given client will use the same proxy server over a period of time, and the proxy configuration is dependent on the site where the client is running. Forward proxy servers are usually run by the client organization or an internet service provider. Forward proxy servers are fairly close to the client. Conversely, a reverse proxy server represents one or a few origin servers. Typically, random servers cannot be accessed through a reverse proxy server. Only a predetermined set of files—those available from the origin server(s) that the reverse proxy is serving—are available from the reverse proxy server. A reverse proxy server is a designated proxy server for those specific servers. Furthermore, the designated proxy server is used by all clients for access to the specific site of the server being serviced. A reverse proxy server is usually run by the same organization that runs the main origin server for which the proxy is a reverse proxy.

The reverse proxy concept is useful in terms of transcoders because a transcoding proxy server most often works as a reverse proxy server. Therefore, transcoding servers dedicated to the dissemination of enterprise information over a network would take responsibility for converting the requested documents into a format compatible with the network.

Prior art transcoding servers can also transcode data from many origin servers, both within and outside the enterprise. Prior art transcoding proxies have heretofore not integrated semantic information with syntactic format transcoding. While separate methods for natural language translation and syntactic transcoding exist, the broad area of semantic transcoding, particularly with the semantic information, has been overlooked by prior art.

SUMMARY OF THE INVENTION

Initially, a client requests a specific document and provides the preferences, including readability level preferences of the document, locale preferences, content filtering instruction preferences, governmental regulation preferences, natural language preferences, and document syntactic format preferences. The transcoding proxy requests and receives the document from the origin server, with the document having origin semantic characteristics. The document from the origin server has an origin readability level and origin locale; it is conformant with origin content filtering instructions and origin governmental regulations; and it is in origin natural language and origin document syntactic format.

Using the client semantics preferences, the transcoding proxy revises the document in a sequential or parallel fashion. The origin semantic characteristics of the document are thus revised to the semantic preferences specified by the client.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 3:
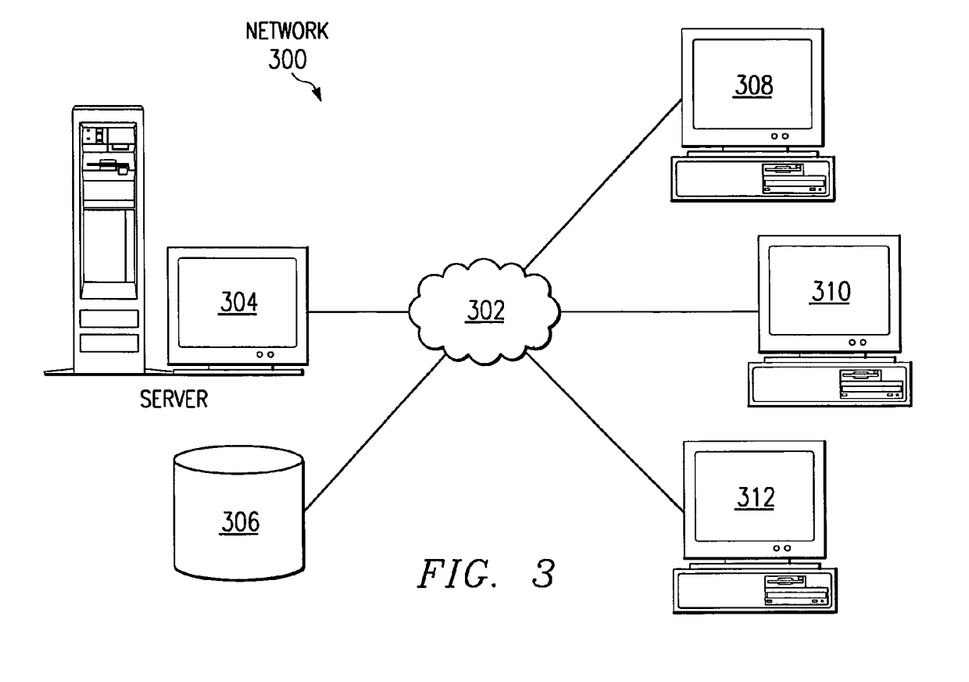
FIG. 3 is a pictorial representation of a distributed data processing system in which the present invention may be implemented.

With reference now to the figures, and in particular with reference to FIG. 3, a pictorial representation of a distributed data processing system in which the present invention may be implemented is depicted.

Distributed data processing system 300 is a network of computers in which the present invention may be implemented. Distributed data processing system 300 contains a network 302, which is the medium used to provide communications links between various devices and computers connected together within distributed data processing system 300. Network 302 may include permanent connections, such as wire or fiber optic cables, or temporary connections made through telephone connections.

In the depicted example, server 304 is connected to network 302 along with storage unit 306. In addition, clients 308, 310 and 312 also are connected to network 302. These clients 308, 310 and 312 may be, for example, personal computers or network computers. For purposes of this application, a network computer is any computer coupled to a network, which receives a program or other application from another computer coupled to the network. In the depicted example, server 304 provides data, such as boot files, operating system images, and applications, to clients 308–312. Clients 308, 310 and 312 are clients to server 304.

Between any one of clients 308, 310 and 312 and server 304 may exist a transcoding proxy of the type described above with respect to FIGS. 1 and 2, or alternatively, a reverse proxy which is not specifically depicted in either illustration. Distributed data processing system 300 may include additional servers, clients, and other devices not shown.

In the depicted example, distributed data processing system 300 is the Internet, with network 302 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 300 also may be implemented as a number of different types of networks, such as an intranet or a local area network.

FIG. 3 is intended as an example and not as an architectural limitation for the processes of the present invention.

Figure 4:
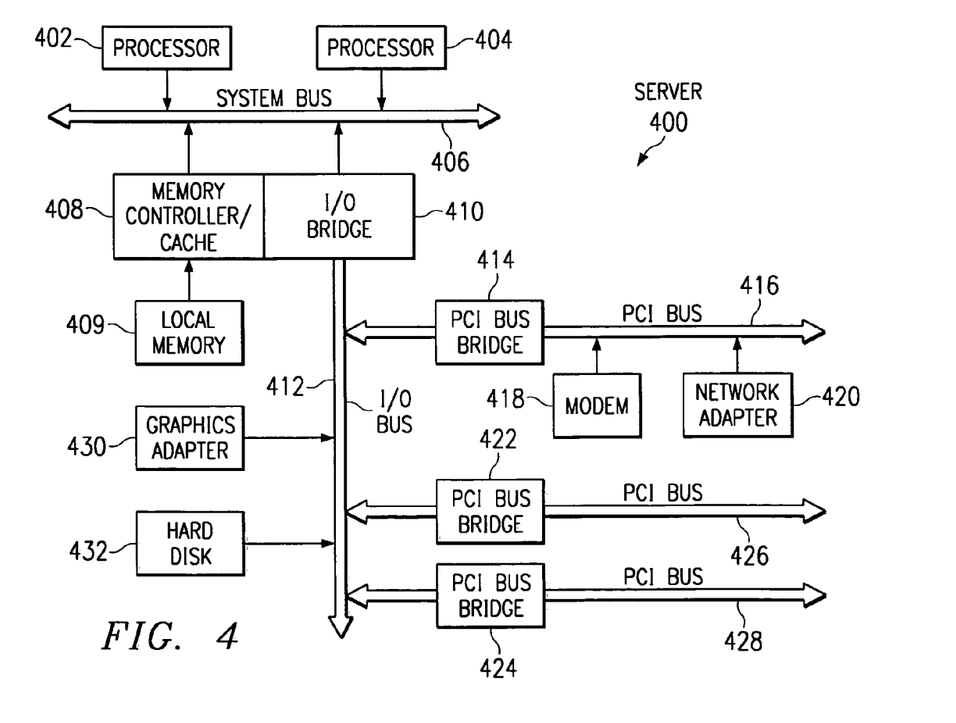
FIG. 4 is a block diagram of a data processing system which may be implemented as a server in accordance with the present invention.

Referring to FIG. 4, a block diagram of a data processing system which may be implemented as a server, such as server 304 in FIG. 3, is depicted in accordance with the present invention. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. Modem 418 and network adapter 420 may be connected to PCI bus 416. A network adapter is generally defined as any circuitry that allows devices to communicate with other devices on a particular network such as the Internet, an intranet or other network configuration including local area networks (LAN) and wide area networks (WAN). Typical PCI bus implementations support four PCI expansion slots or add-in connectors. Communications links to network computers 308-312 in FIG. 3 may be provided through modem 418 and network adapter 420 connected to PCI local bus 416 through add-in boards.

Additional PCI bus bridges 422 and 424 provide interfaces for additional PCI buses 426 and 428, from which additional modems or network adapters may be supported. In this manner, server 400 allows connections to multiple network computers. A memory mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used, in addition to or in place of the hardware depicted. The depicted example is not meant to imply architectural limitations with respect to the present invention.

The data processing system depicted in FIG. 4 may be, for example, an IBM RS/6000 system, a product of International Business Machines Corporation in Armonk, New York, running the Advanced Interactive Executive (AIX) operating system.

Figure 5:
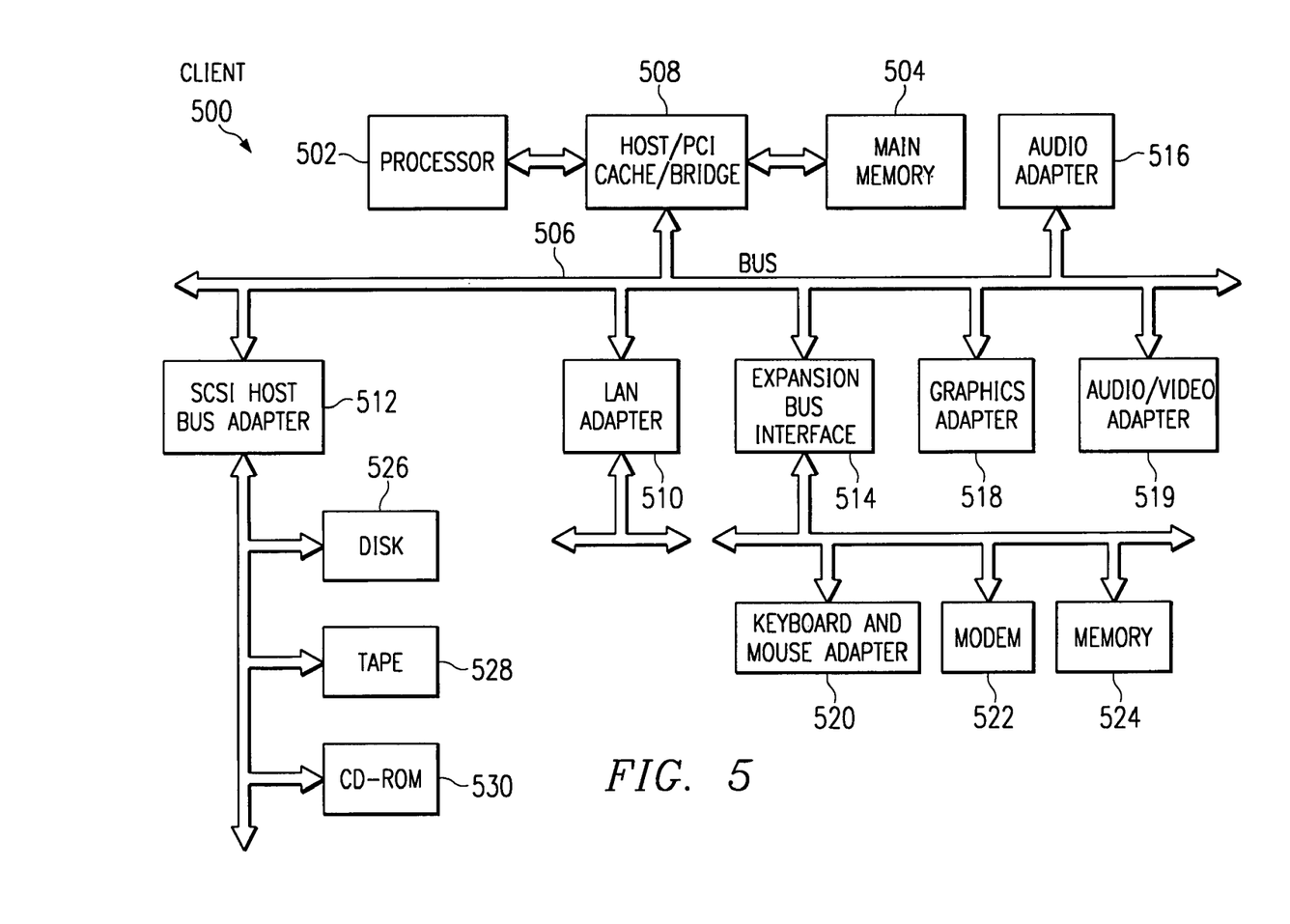
FIG. 5 is a block diagram of a data processing system which may be implemented as a client, in which the present invention may be implemented.

With reference now to FIG. 5, a block diagram of a data processing system in which the present invention may be implemented is illustrated. Data processing system 500 is an example of a client computer. Data processing system 500 employs a peripheral component interconnect (PCI) local bus architecture. Although the depicted example employs a PCI bus, other bus architectures such as Micro Channel and ISA may be used. Processor 502 and main memory 504 are connected to PCI local bus 506 through PCI bridge 508. PCI bridge 508 also may include an integrated memory controller and cache memory for processor 502. Additional connections to PCI local bus 506 may be made through direct component interconnection or through add-in boards. In the depicted example, local area network adapter 510, SCSI host bus adapter 512, and expansion bus interface 514 are connected to PCI local bus 506 by direct component connection. In contrast, audio adapter 516, graphics adapter 518, and audio/video adapter (A/V) 519 are connected to PCI local bus 506 by add-in boards inserted into expansion slots. Expansion bus interface 514 provides a connection for a keyboard and mouse adapter 520, modem 522, and additional memory 524. SCSI host bus adapter 512 provides a connection for hard disk drive 526, tape drive 528, and CD-ROM drive 530 in the depicted example. Typical PCI local bus implementations support three or four PCI expansion slots or add-in connectors.

In the present example, an operating system runs on processor 502 and is used to coordinate and provide control of various components within data processing system 500 in FIG. 5. The operating system may be a commercially available operating system, such as OS/2, which is available from International Business Machines Corporation. "OS/2" is a trademark of International Business Machines Corporation, or a UNIX based system, such as AIX, also available from International Business Machines Corporation. An object oriented programming system such as Java may run in conjunction with the operating system and provides calls to the operating system from Java™ programs or applications executing on data processing system 500. Instructions for the operating system, the object-oriented operating system, and applications or programs are located on storage devices, such as hard disk drive 526, and may be loaded into main memory 504 for execution by processor 502.

Those of ordinary skill in the art will appreciate that the hardware in FIG. 5 may vary, depending on the implementation. For example, other peripheral devices, such as optical disk drives and the like, may be used in addition to or in place of the hardware depicted in FIG. 5. The depicted example is not meant to imply architectural limitations with respect to the present invention. For example, the processes of the present invention may be applied to multiprocessor data processing systems.

FIGS. 3–5 illustrate a preferred embodiment of a computer system that can advantageously employ the improved packet sequencing system of the present invention. The system of FIG. 3 may be seen to represent clients or servers depicted in FIG. 6.

Current web-based transcoders typically do one of the following:
(1) Convert documents syntactically from one format to another, e.g., PDF to HTML, without analyzing the semantics;
(2) Convert documents from web formatted data to a format more suitable for displaying on certain devices; and
(3) Converts data which is typically broadcast using a non-HTTP protocol into HTTP format, to be displayed using a normal browser.

There is an absence of support for converting documents based on semantic characteristics like readability level, locale, governmental regulations, and content-filtering in a web-based transcoding paradigm.

However, with the Internet being widely used by a large section of the population with diverse reading skills, readability levels of documents transmitted across the Internet is of paramount importance. In addition, with the Internet being a global medium of communication, various incompatibilities involving locales, nature and form of content, governmental restrictions on documents, and natural language of content arise when documents are syntactically transcoded for transmission across national boundaries. Furthermore, many of these semantic features, like readability level, conversion, and language translation of documents, either after or before transcoding the syntactic format, are time-consuming, even in a server.

In particular, a thin client may not have adequate resources for local installation of readability level conversion software or complex natural language translation software. This invention seeks to facilitate the solution to the above problems by performing these semantic transcodings in the transcoding proxy in conjunction with syntactic transcoding.

It should be stressed that there may be more semantic attributes associated with documents than the ones listed above. This invention provides a generalized method to incorporate these attributes into the syntax based transcoding framework.

In accordance with a preferred embodiment of the present invention, a document transcoder in the transcoding proxy would have access to client semantic preference information over and beyond the syntactic document translation format. Such information on client preferences would include formatted data on the readability levels of documents. In many cases, the same document may be presented to readers with various levels of language skills. For example, a fifth-grade student has a different level of language skill than an English Ph.D. However, they may both need to read an article on the same topic on the Internet. A document on the selected topic could be presented at various readability levels, either by dynamic conversions to various readability levels or via multiple static versions, each with an associated readability level.

Another client preference would include formatted data on the different locales, for instance numerics, currency, current time, date, etc., that vary from locale to locale. Natural language preferences would include formatted data on the language to which the document is to be translated, e.g., Spanish or Chinese. Still another client preference would include formatted data on content filtering, to the extent possible, via existing filtering methodologies (e.g., material restricted to specific age groups and labeled as such, or parts of documents labeled as restricted to specific age groups). Finally, another client preference would include formatted data on governmental regulations on encrypted data transmission, receipt in censorship, and security conscious entities (e.g., security classifications of documents). National, as well as local regulations pertaining to the format and content of information may vary from one jurisdiction to another. Certain jurisdictions may restrict information from its residents. However, a resident of one jurisdiction may inadvertently request documents or technologies which are prohibited in the resident's own jurisdiction. Conversely, a jurisdiction might prohibit the exportation of certain information or technology to specific jurisdictions. In this case, a web server might inadvertently transfer restricted information to residents of the sanctioned jurisdiction.

It is important to note that, prior to converting the semantic characteristics document (or even the syntactic characteristics), the present semantic characteristics of the document must be determined. Generally, the document attributes are contained in the document header describing the syntactic characteristics of the document, such as the document's format. However, the semantic characteristics of a document are much more inconspicuous. One method for determining and describing each semantic characteristic of a document is to identify individual semantic characteristics associated with the document in the document header, similar to syntactic characteristics. For example, the readability level might be described as an eighth grade standard with the locale as the State of Virginia in the United States (from which locale, semantic characteristics such as monetary currency, time zone, and units of measure could be easily deduced). The document's author may provide this information. Alternatively, an origin server may employ a semantic-crawler to analyze the semantic characteristics of each document on the server and then modify the document header to include descriptions of each relevant semantic characteristic based on the analysis. The semantic-crawler might also tag each word dealing with certain semantic characteristics, such as time, date, monetary units, or units of measure. In so doing, the transcoding proxy need only search for the tagged terms and words, and convert the terms according to the user preferences.

While identifying the semantic characteristics of a document might be helpful, the document would still require parsing at the transcoding proxy for such semantic characteristics as readability and natural language. Moreover, while some documents may be received from the origin server with the semantic terms tagged, the proxy server could not rely on the origin server for tagging the semantic characteristics of a document. Therefore, in accordance with a preferred embodiment of the present invention, the transcoding proxy may include a semantic parser for parsing the words and terms in a document and analyzing the semantic characteristics of each word or phrase. Once the semantic terms have been identified, and the semantic characteristics have been defined, the transcoding proxy can convert the tagged words and phrases in accordance with the user preferences received from the client.

Figure 6:
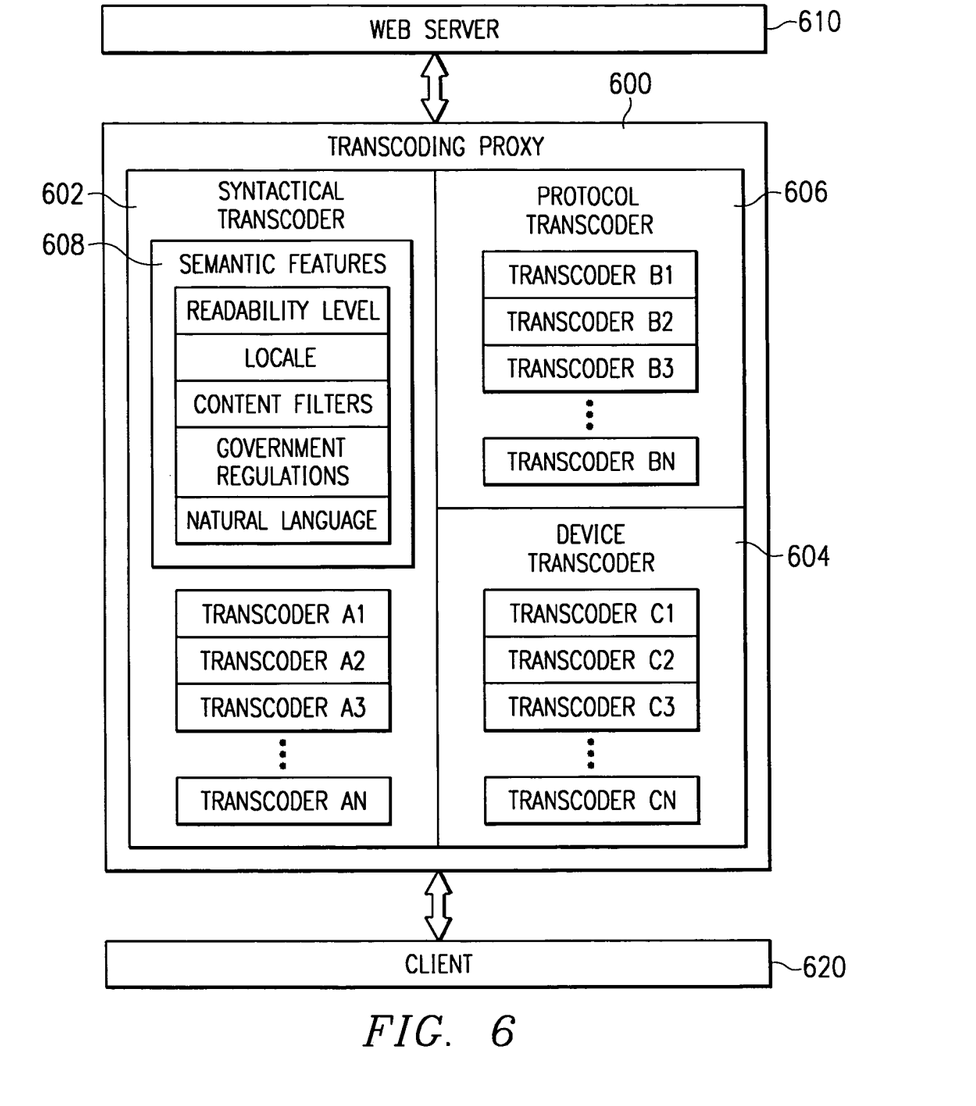
FIG. 6 is a block diagram illustrating a preferred embodiment of the present invention, for implementing semantics features in a syntactical transcoder.

FIG. 6 is a block diagram illustrating a preferred embodiment of the present invention, for implementing semantic features in a syntactical transcoder. FIG. 6 depicts a prior art relationship between transcoding proxy 600, client 620, and web server 610. As described above, client 620 makes a request for a URL. Transcoding proxy 600 passes the request to web server 610 and intercepts the returned request results which were intended for client 620.

Transcoding proxy 600 includes all transcoding functions described above with resect to transcoding proxy 100 shown in FIG. 1, including syntactical transcoder 602 for converting individual data formats from one format to another, device transcoder 604 for converting web formatted data to a format more suitable for displaying on certain devices, and protocol transcoder 606 for converting data which is typically broadcast using a non-HTTP protocol into HTTP protocol.

In addition to the above-described functionality, transcoding proxy 600 now includes semantic features 608 in addition to the already available syntactic transcoding features in syntactic transcoder 602. These transcoder features include, but are not limited to: readability level conversions for presenting the document to readers with various levels of language skills; locale conversions, for converting constants that vary from locale to locale; content filtering for restricting document content from specified readers; governmental regulation restrictions for restricted media and content regulated by governmental mandate; and natural language translators for translating the document language.

Depending on the configuration of the proxy server in the network, once the request for the document is received and passed on by transcoding proxy 600, the proxy is then provided with the semantic preferences from client 620. This process may proceed by various modes, such as the client merely sending semantics preferences to the transcoding proxy without being queried. This could be the mode in the case of reverse transcoding proxies that receive requests from a number of clients for a single origin server. Other cases, forward transcoding proxies, for instance, might query the client for necessary preferences. In the case of forward transcoding proxies, certain preferences might remain fairly constant, such as natural language, government regulations, and locale; while reader level and content may change from user to user. In that case, the forward transcoding proxy stores some preferences and requests the remainder of the preferences from the client. Standard techniques for content negotiation may be used between the transcoding proxy and client(s).

Returning to FIG. 6, transcoding proxy 600 converts the requested documents to a form compatible with client 620 by using the semantics preference specified by client 620. As can be seen from the above description, the document transcoder modifies the transcoded output to suit the client. That is, the transcoding server not only converts the document from, say, one syntactic format to another (e.g., PDF to HTML), but also simultaneously translates the document into the client-preferred readability level and natural language with appropriate content-filtering, locale information, and governmental regulations compliance on the transmitting and receiving ends.

Figure 7:
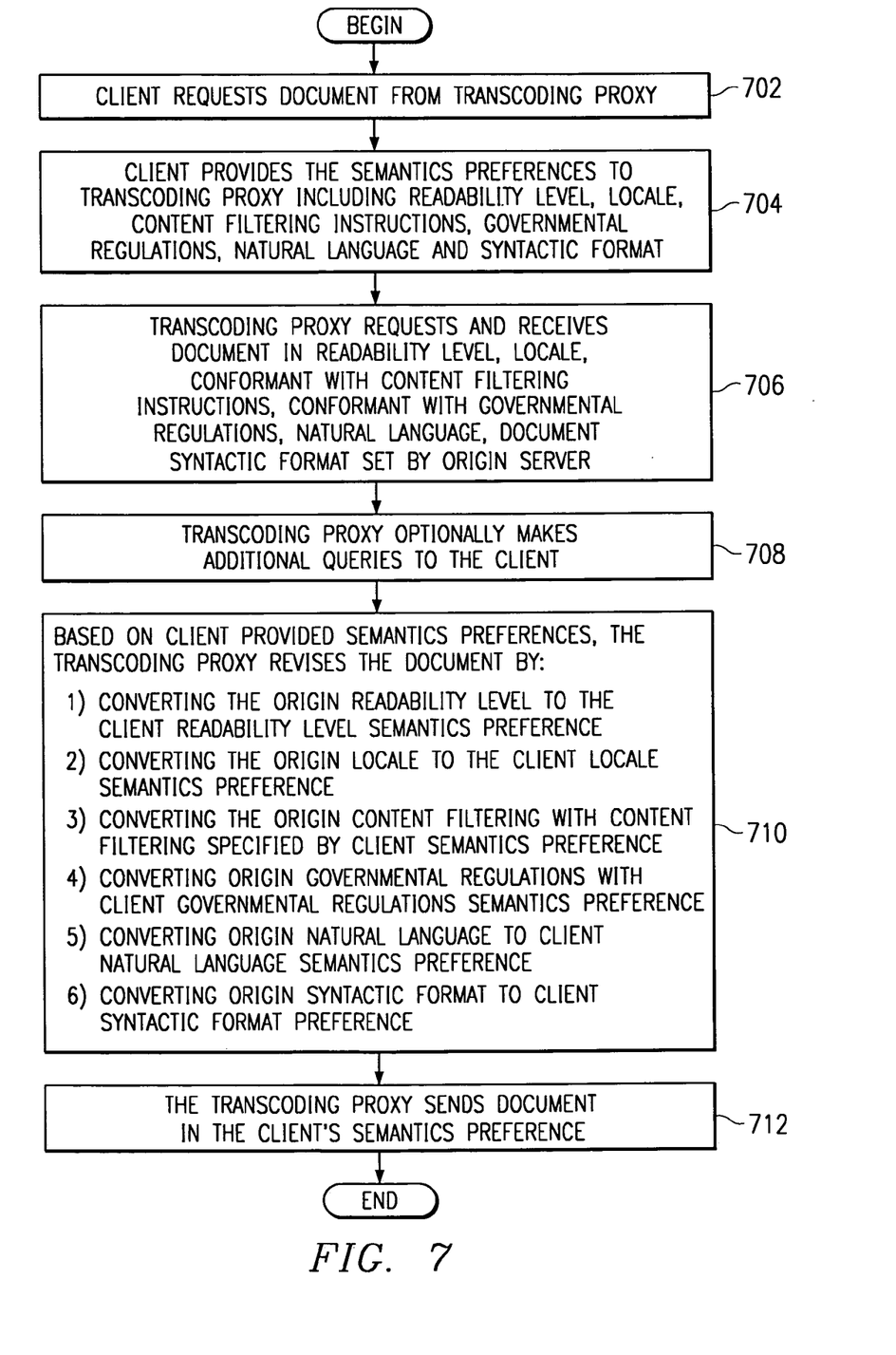
FIG. 7 is a flowchart depicting the process of converting document semantics in association with converting the document's syntactic format.

FIG. 7 is a flowchart depicting the process of converting document semantics in association with converting the document's syntactic format. The process begins with a client requesting a specific document. For example, say document D is requested from the transcoding proxy (step 702). The client provides the semantics preferences, including but not limited to: readability level preferences of document (e.g., readability level $RL\_1$); locale preferences, $L\_1$; content filtering instructions preferences, $CF\_1$; governmental regulations preferences, $GR\_1$; natural language of document preferences, $N\_1$; and document syntactic format preferences, $D\_1$ (step 704).

The transcoding proxy requests and receives document D, from the web server (also known as the origin server) in the origin readability level of document D, for example, $RL\_2$, origin locale, $L\_2$, conformant with origin content filtering instructions, $CF\_2$, conformant with origin governmental regulations, $GR\_2$, in origin natural language of document, $N\_2$, and in origin document syntactic format (step 706).

Optionally, the transcoding proxy makes additional queries to the client in order to further identify client preferences and capabilities (step 708). Using the client semantics preferences, the transcoding proxy revises document D (step 710). The revision can be accomplished sequentially or in parallel or as would be understood by an ordinary artisan in the art. By way of the example origin document, document D, the transcoding proxy converts the origin semantics of document D to the semantics of the client. The origin readability level of document D, $RL\_2$, is converted to the client readability preference, $RL\_1$. The origin locale, $L\_2$, is converted to the client locale preference, $L\_1$. The origin content filtering, CF_2, is converted to client content filtering, CF_1. The origin governmental regulations, GR_2, are converted to the client preference, GR_1. The document's natural language, N_2, is translated to the client's preference natural language, N_1. Finally, the origin syntactic format, D_2, is converted to the client syntactic preference, D_1. After the conversion, document D is sent to the client (step 712). At that time, the document semantics are readability level RL_1, locale is L_1, conformant with CF_1 content filtering instructions, conformant with GR_1 governmental regulations, N_1 natural language of document, and document syntactic format of D_1.

Figure 8:
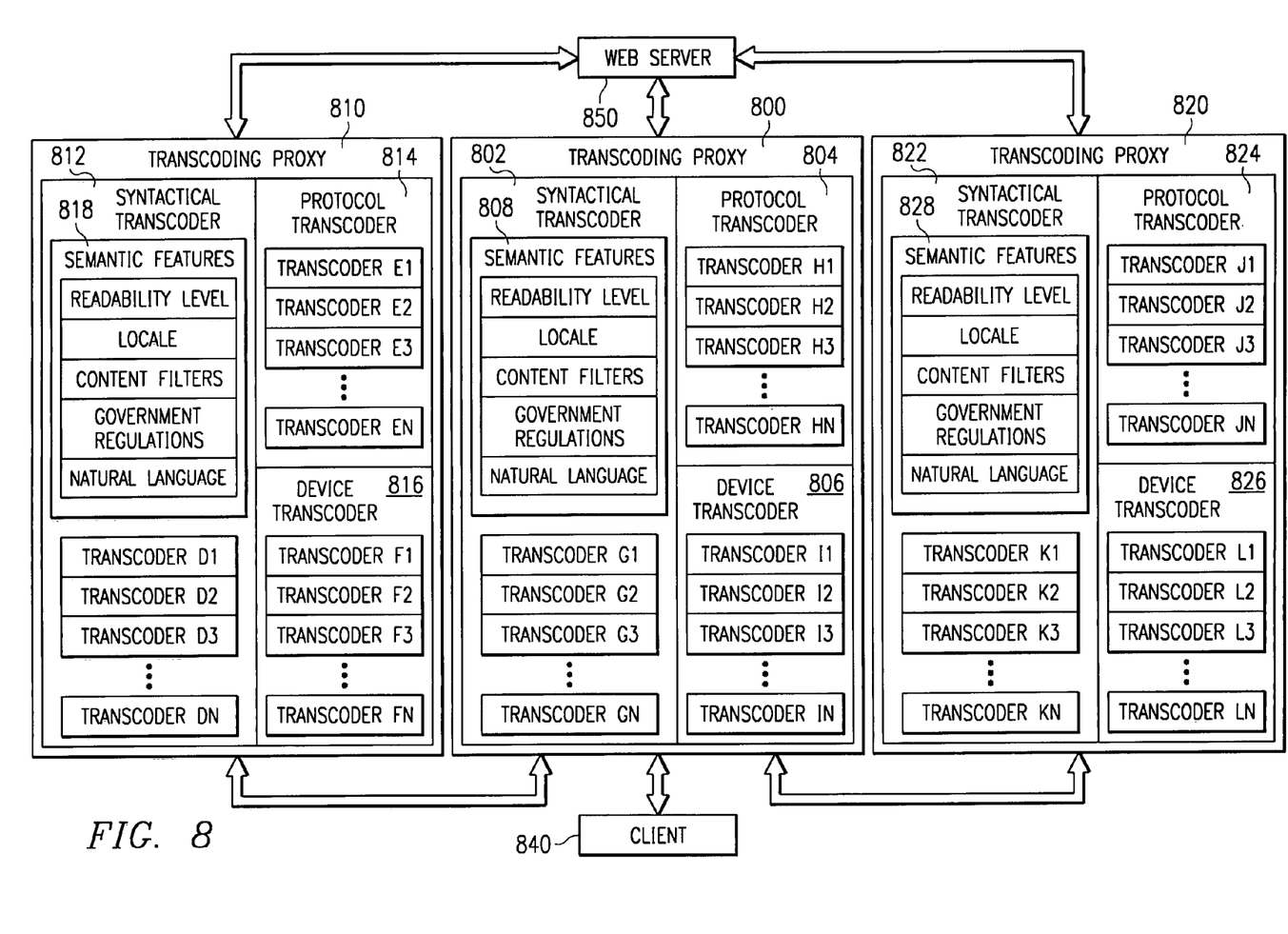
FIG. 8 depicts a configuration between a plurality of transcoding proxies, a client, and a web server, for providing multiple transformations in order to provide a wide range of semantics preference options in formatting a document for a client.

FIG. 8 depicts a configuration between transcoding proxies 800, 810 and 820, client 840, and web server 850, for providing multiple transformations in order to provide a wide range of semantics preference options in formatting a document for a client. Transcoding proxies 800, 810 and 820 are identical in functionality to transcoding proxy 600, including semantics features, and therefore, will not be discussed in detail again.

In the depicted example, client 840 makes a request for a uniform resource locator (URL). Transcoding proxy 800 is then provided by the semantic preferences from client 840. Next, transcoding proxy 800 compares the semantics preferences to the semantics features supported by transcoding proxy 800 and, if all conversions are supported by transcoding proxy 800, the request is sent to the origin server, web server 850. If not, transcoding proxy 800 passes the request to an intermediate transcoding proxy, such as transcoding proxy 810, for intermediate semantics conversions. In that case, the requested document is returned from transcoding proxy 810 partially transcoded, such that transcoding proxy 800 can complete the conversions. The fully transcoded document is then returned to client 840.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such as floppy discs, hard disk drives, RAM, and CD-ROMs and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. This embodiment was chosen and described in order to best explain the principles of the invention and the practical application, and to enable others of ordinary skill in the art to understand the invention for various embodiments with various modifications as are suited to the particular use contemplated.

What is claimed is:

1. A transcoder processing system implemented method for converting documents based on semantic characteristics, comprising:
   parsing a document to determine semantic characteristics in the document;
   generating semantic tags corresponding to the semantic characteristics in the document to form a semantically tagged document;
   receiving a request for a document from a client;
   passing the request to an origin server;
   receiving the semantically tagged document corresponding to the requested document from the origin server;
   parsing the semantically tagged document corresponding to the requested document to locate semantic tags in the document;
   performing a syntactical transcoding on the semantically tagged document corresponding to the requested document to form a transcoded semantically tagged document, wherein at least one semantic characteristic corresponding to a semantic tag in the semantically tagged document is converted based on the information regarding each semantic characteristic of the semantically tagged document; and
   sending transcoded semantically tagged document with the at least one converted semantic characteristic to the client.

2. The transcoder processing system implemented method recited in claim 1 further comprises receiving at least one semantic characteristic preference from the client, wherein the at least one semantic characteristic is automatically converted based on the at least one semantic characteristic preference.

3. The transcoder processing system implemented method recited in claim 2, wherein a semantic characteristic preference specified by the client is readability level of the requested document.

4. The transcoder processing system implemented method recited in claim 3, wherein the at least one semantic characteristic is the readability level of the requested document.

5. The transcoder processing system implemented method recited in claim 2, wherein a semantic characteristic preference specified by the client is locale.

6. The transcoder processing system implemented method recited in claim 5, wherein the at least one semantic characteristic is the locale characteristic of the requested document.

7. The transcoder processing system implemented method recited in claim 2, wherein a semantic characteristic preference specified by the client is conformance with specified governmental regulations by the requested document.

8. The transcoder processing system implemented method recited in claim 7, wherein the at least one semantic characteristic is the conformance with specified governmental regulations of the requested document.

9. The transcoder processing system implemented method recited in claim 2, wherein a semantic characteristic preference specified by the client is conformance with specified content filtering in the requested document.

10. The transcoder processing system implemented method recited in claim 9, wherein the at least one semantic characteristic is the conformance with specified content filtering of the requested document.

11. The transcoder processing system implemented method recited in claim 2, wherein a semantic characteristic preference specified by the client is the natural language of the requested document.

12. The transcoder processing system implemented method recited in claim 11, wherein the at least one semantic characteristic is the natural language of the requested document.

13. The transcoder processing system implemented method recited in claim 2 further comprises comparing the at least one semantic characteristic preference received from the client with semantic conversion features supported by the transcoder processing system.

14. The transcoder processing system implemented method recited in claim 13, wherein the step of passing the request to a server further comprises passing the request to a transcoding server on the basis of the comparison.

15. A transcoder processing system for converting documents based on semantic characteristics, comprising:
- parsing means for parsing a document to determine semantic characteristics in the document;
- generating means for generating semantic tags corresponding to the semantic characteristics in the document to form a semantically tagged document;
- receiving means for receiving a request for a document firm a client;
- passing means for passing the request to an origin server;
- receiving means for receiving the semantically tagged document corresponding to the requested document from the origin server;
- parsing means for parsing the semantically tagged document corresponding to the requested document to locate semantic tags in the document;
- performing means for performing a syntactical transcoding on the semantically tagged document corresponding to the requested document to form a transcoded semantically tagged document, wherein at least one semantic characteristic corresponding to a semantic tag in the semantically tagged document is converted based on the information regarding each semantic characteristic of the semantically tagged document; and
- sending means for sending the transcoded semantically tagged document with the at least one converted semantic characteristic to the requesting client.

16. The transcoder processing system recited in claim 15 further comprises receiving means for receiving at least one semantic characteristic preference from the client.

17. The transcoder processing system recited in claim 15, wherein a semantic characteristic preference specified by the client is readability level of the requested document.

18. The transcoder processing system recited in claim 17, wherein the at least one semantic characteristic is the readability level of the requested document.

19. The transcoder processing system recited in claim 15, wherein a semantic characteristic preference specified by the client is locale.

20. The transcoder processing system recited in claim 19, wherein the at least one semantic characteristic is the locale characteristic of the requested document.

21. The transcoder processing system recited in claim 15, wherein a semantic characteristic preference specified by the client is conformance with specified governmental regulations by the requested document.

22. The transcoder processing system recited in claim 21, wherein the at least one semantic characteristic is the conformance with specified governmental regulations of the requested document.

23. The transcoder processing system recited in claim 15, wherein a semantic characteristic preference specified by the client is conformance with specified content filtering in the requested document.

24. The transcoder processing system recited in claim 23, wherein the at least one semantic characteristic is the conformance with specified content filtering of the requested document.

25. The transcoder processing system recited in claim 16 further comprises comparing means for comparing the at least one semantic characteristic preference received from the client with semantic conversion features supported by the transcoder processing system.

26. The transcoder processing system recited in claim 25, wherein the passing means for passing the request to a server further comprises passing means for passing the request to a transcoding server on the basis of the comparison.

27. A transcoder processing computer program product for converting documents based on semantic characteristics, comprising:
- parsing instructions for parsing a document to determine semantic characteristics in the document;
- generating instructions for generating semantic tags corresponding to the semantic characteristics in the document to form a semantically tagged document;
- receiving instructions for receiving a request for a document from a client;
- passing instructions for passing the request to an origin server;
- receiving instructions for receiving the semantically tagged document corresponding to the requested document from the origin server;
- parsing instructions for parsing the semantically tagged document corresponding to the requested document to locate semantic tags in the document;
- performing instructions for performing a syntactical transcoding on the semantically tagged document corresponding to the requested document to form a transcoded semantically tagged document, wherein at least one semantic characteristic corresponding to a semantic tag in the semantically tagged document is converted based on the information regarding each semantic characteristic of the semantically tagged document; and
- sending instructions for sending the transcoded semantically tagged document with the at least one converted semantic characteristic to the requesting client.

* * * * *